United States Patent [19]

Chan

[11] Patent Number: 4,998,198

[45] Date of Patent: Mar. 5, 1991

[54] DYNAMIC BURST CONTROL FOR DATA TRANSFERS

[75] Inventor: Wing M. Chan, Fremont, Calif.

[73] Assignee: Tandem Computers Incorporated, Cupertino, Calif.

[21] Appl. No.: 178,667

[22] Filed: Apr. 7, 1988

[51] Int. Cl.[5] .............................................. G06F 13/00
[52] U.S. Cl. ................................. 364/200; 364/900; 364/242.8; 364/241.2; 364/260; 364/238.3; 364/941; 364/940; 364/926.93
[58] Field of Search ................................ 364/200, 900

[56] References Cited

U.S. PATENT DOCUMENTS

| 4,383,295 | 5/1983 | Miller et al. | 364/200 |
| 4,484,271 | 11/1984 | Miu et al. | 364/200 |
| 4,719,622 | 1/1988 | Whipple et al. | 364/200 |
| 4,736,291 | 4/1988 | Jennings et al. | 364/200 |
| 4,760,515 | 7/1988 | Malmguist et al. | 364/200 |
| 4,831,523 | 5/1989 | Lewis et al. | 364/200 |

Primary Examiner—Michael R. Fleming
Assistant Examiner—Gopal C. Ray
Attorney, Agent, or Firm—Townsend and Townsend

[57] ABSTRACT

In a data processing system, a device controller, configured to control data transfers between a processor unit and a peripheral device on an input/output bus, is provided with apparatus that permits a data transfer cycle to continue until all data has been transferred, or to allow for interruption of the data transfer cycle by another device controller requesting access to the input-/output via a request signal. During a data transfer cycle the apparatus resonds to detection of the request signal to interrupt the data transfer cycle after a predetermined number of data words are transferred, permitting access to the input/output bus for other of the device controllers. In absence of the request signal, the apparatus permits the data transfer to continue until all data has been transferred between the peripheral device and the processor unit.

10 Claims, 3 Drawing Sheets

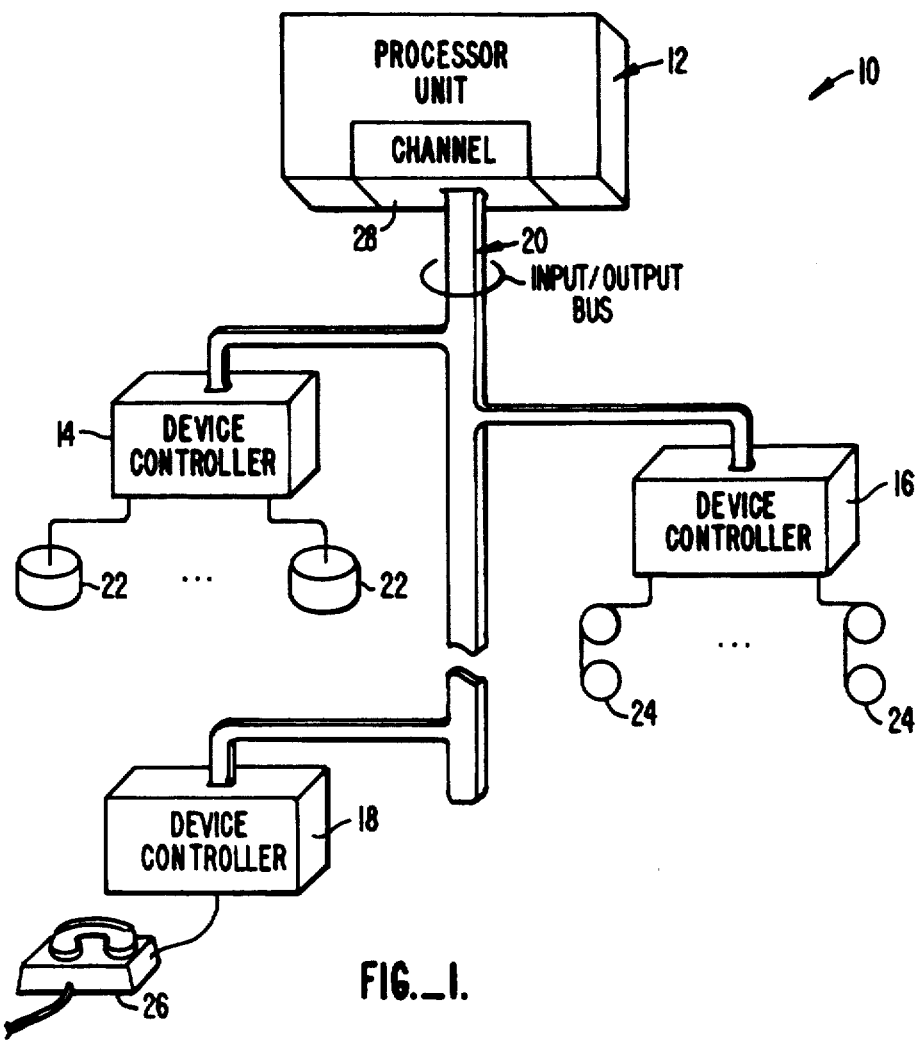
FIG._1.
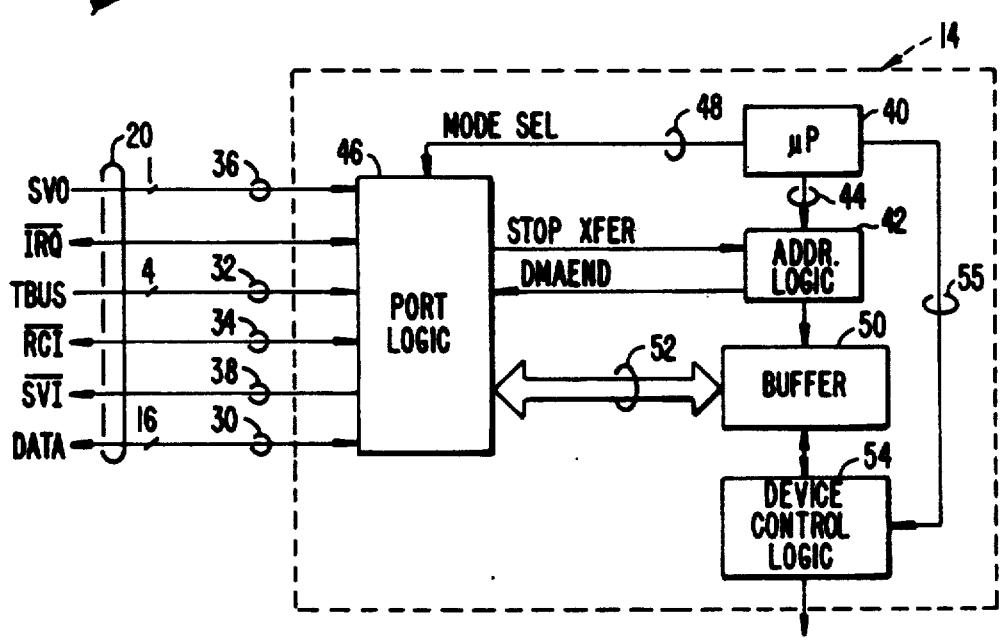
FIG._2A.

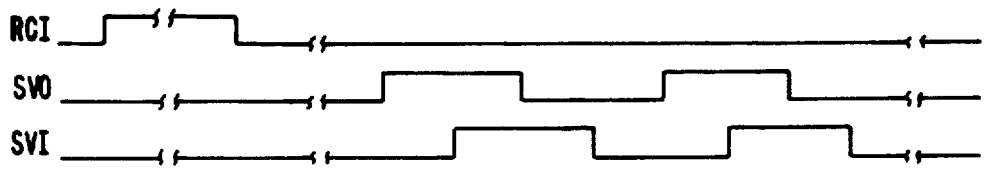
FIG._2B.
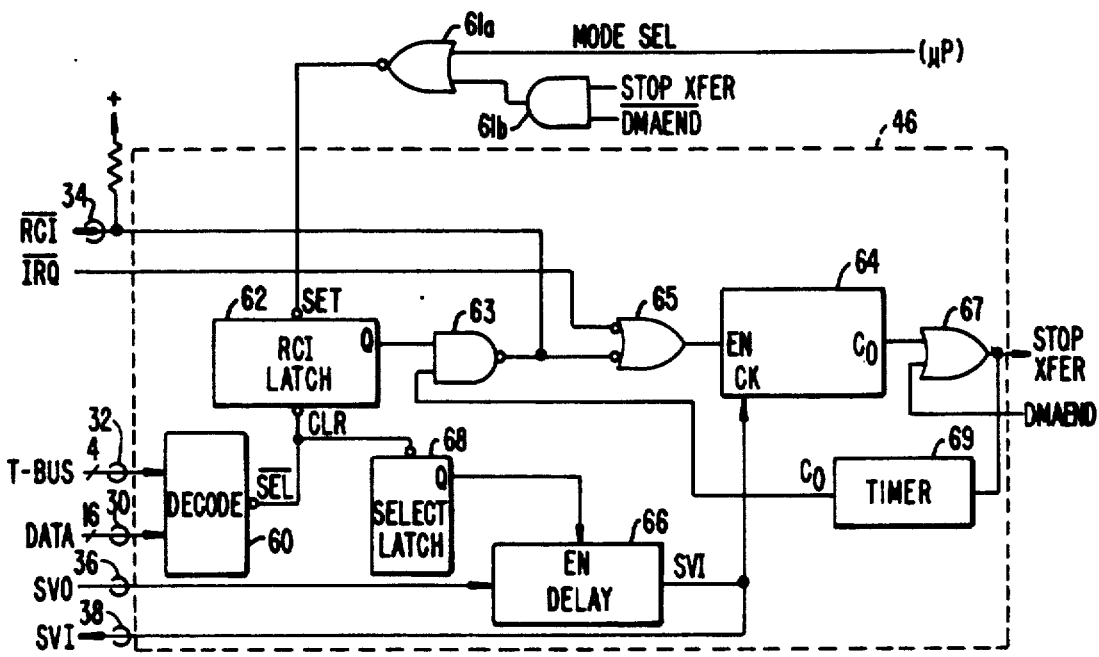
FIG._3.
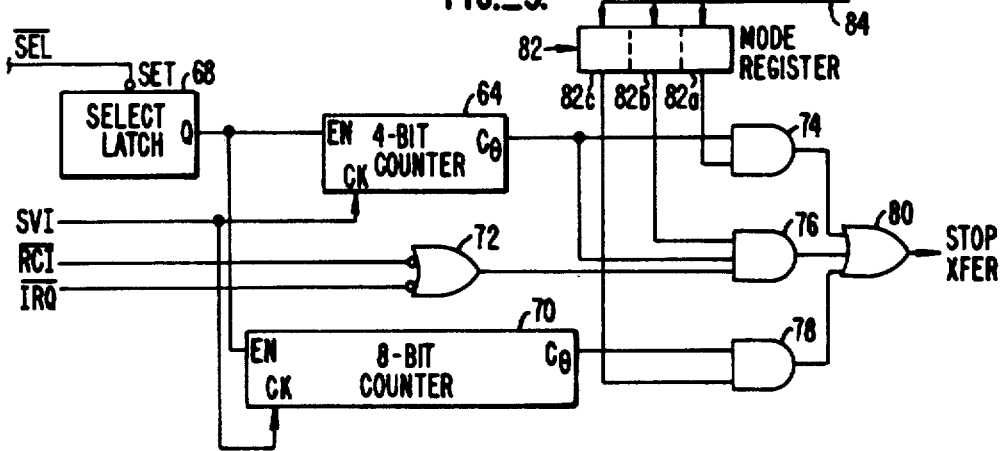
FIG._4.

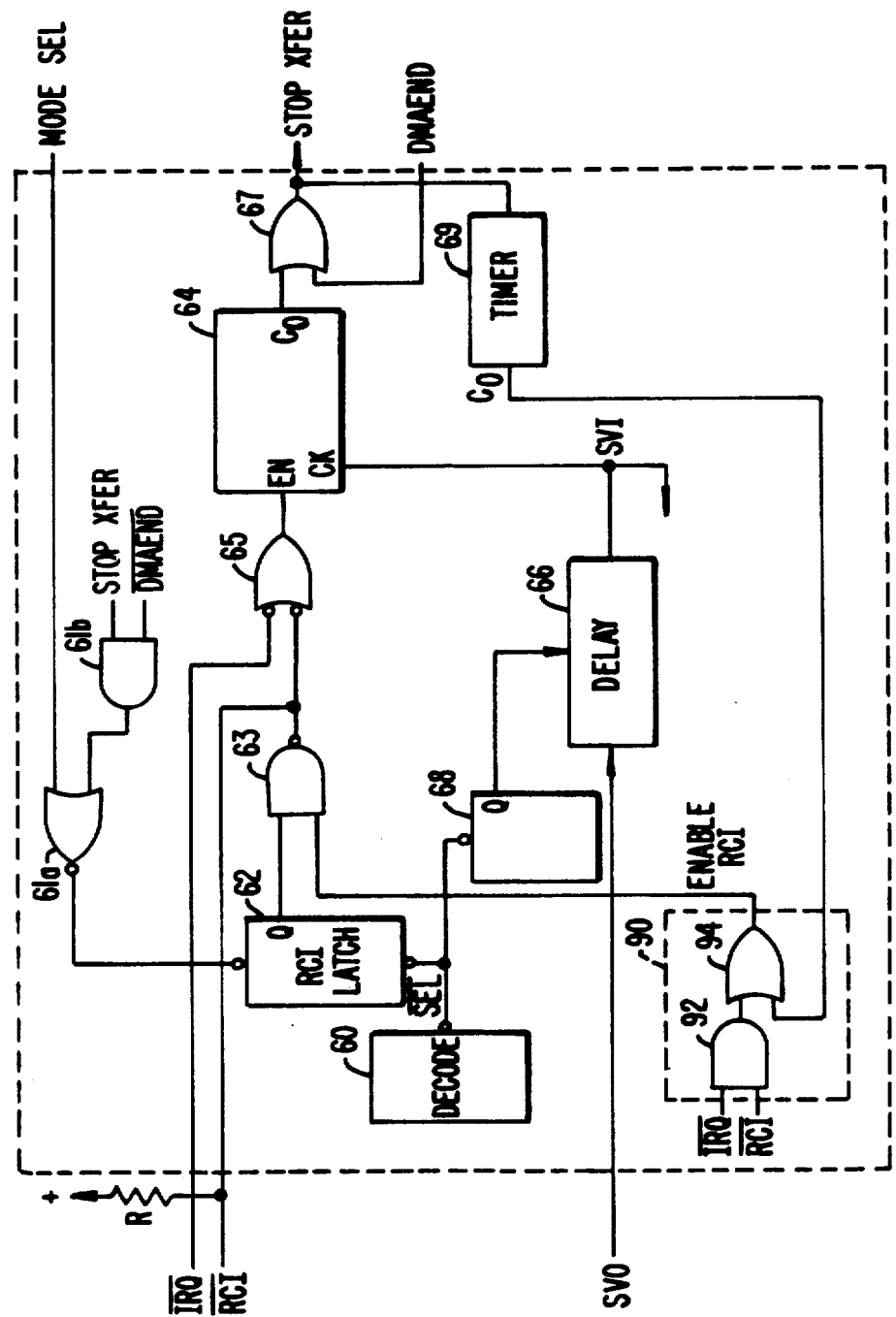
FIG._5.

PATENT NUMBER 4,998,198

DYNAMIC BURST CONTROL FOR DATA TRANSFERS

BACKGROUND OF THE INVENTION

The present invention relates generally to transferring data between a peripheral device and a processor of a data processing system. More particularly, the invention is directed to a method, and apparatus for implementing that method, for conducting a data transfer cycle to transfer data between the processor unit and the peripheral device that depends upon the activity of the other device controllers, permitting much higher actual data rates, yet giving access for data transfers to lower priority peripheral devices.

Today's data processing systems are capable of processing huge amounts of data. This data, however, is not stored in the primary storage area (i.e., memory) of the processor unit itself, but rather in a secondary storage area usually in the form of such peripheral devices such as tape devices, disk drive devices, and the like. Data processing systems will typically include at least one or more processor units connected by an input/output (I/O) bus, to a plurality of device controllers which, in turn, couple the I/O bus to peripheral devices (i.e., the aforementioned tape and disk devices, as well as printers, communication devices, and the like).

As is well known, certain peripheral devices (e.g., disk devices) are capable of transferring data at a much higher data rate than other peripheral devices (e.g. communication devices, printers, etc.). When a number of peripheral devices, and in particular a number of varying types of peripheral devices, are coupled (via device controllers) to the I/O bus it is undesirable to have one peripheral device tie up the I/O bus in a data transfer cycle that excludes the other peripheral devices; the result can be a loss of data. For example, the device controller that connects a peripheral device to the I/O bus typically can include buffering (temporary storage) to temporarily hold data that is to be transferred from the controlled peripheral device to the processor unit in the event the I/O bus is being utilized by another device controller/peripheral device combination. If, however, this other peripheral device takes too long to transfer data, the device controller awaiting access to the I/O bus may experience a data overrun (i.e., the buffer receives more data than it can handle, resulting in the loss of data).

One solution to avoiding the data overrun problem is to allow data transfers to occur in short bursts or blocks of a limited number of data words, after which the peripheral device gives up, and is precluded from, access to the I/O bus until sufficient time has elapsed to permit other peripheral devices access. This ensures that data can be transferred by all of the devices, and avoids any data overrun problems.

However, a drawback to this solution is that the effective data rate is substantially lowered due to the "overhead" of a data transfer cycle (which includes the time of preclusion from access to the I/O bus following a data word block transfer—sometimes also called "hold-off" periods). Data transfers comprising transmission of a number of small data word blocks, each accompanied by a hold-off period that is sometimes larger than the transfer time itself, result in an effective data transfer rate that is much less than nominal—even when only one peripheral device is involved in the data transfer.

Of course, trade-offs can be achieved by increasing the amount of temporary storage available in each device controller for buffering, increasing the data word blocks that are transferred each burst period, and decreasing the hold-off periods. Given a specific mix of peripheral devices coupled to a processor unit by an I/O bus, an optimum data rate can be achieved by manipulating these variables. Unfortunately, this will solidify the system configuration, and any attempt to change the configuration by either upgrading or adding additional device controllers seriously affects the overall system performance.

SUMMARY OF THE INVENTION

The present invention provides a method, and apparatus for implementing that method, for automatically adjusting the burst length of the data being transferred between the processor unit and the peripheral device. The adjustment is based upon the access requirements of other of the peripheral devices that are connected to the I/O bus by device controllers.

The method of the present invention is implemented in a data processing system of the type having a data processor unit connected to a plurality of device controller units by an I/O bus. Each device controller unit operates to control peripheral device data transfers that are preceded by a request signal issued by one of the device controllers. The method proceeds generally as follows:

1. During a data transfer cycle, the device controller controlling the data transfer monitors the I/O bus for occurrence of the request signal from other of the device controllers;

2. If occurrence of the request signal is detected, indicating that one or more of the other device controllers is requesting a data transfer cycle, the present data transfer cycle will interrupt after:

(a) transfer of a predetermined number of data words; or (b) transfer of the remaining data words to be transferred whichever is less.

The interrupted device controller then waits a period of time (hold-off) before requesting access to the I/O bus, permitting other peripheral devices to engage in a data transfer cycle with the processor unit.

In an alternate embodiment of the invention, an absolute usage counter is provided so that, in addition to the minimum number of words transferred (after detection of a reconnect signal from another of the device controllers), a maximum data transfer burst can be established.

It will be evident to those skilled in this art that a number of advantages are achieved by the present invention. For example, when there is a lower number of peripheral devices requesting data transfer cycles, the effective data rate of a controller is increased. Even when the number of peripheral devices or an I/O bus increases, the effective data rate of a controller will still be greater than, or at worst equal to, that of existing systems having fixed burst data transfers and fixed hold-off times. In fact, the lower bound for the data rate of the present invention can be seen to be that of such existing systems.

The present invention, therefore, is capable of adjusting the number of data words transferred during a data transfer cycle dynamically, based upon demand for access to the I/O bus.

Other of the advantages, as well as the important features of the invention, will become apparent to those skilled in the art upon a reading of the following detailed description of the invention, which should be taken in conjunction with the accompanying drawings.

BRIEF DESCRIPTION OF THE DRAWINGS

FIG. 1 illustrates a data processing system including a processor unit and a number of device controllers that can advantageously incorporate the present invention;

FIG. 2A is a block diagram of the control portion of a device controller of FIG. 1, and FIG. 2B is an illustrative timing diagram of the handshaking used to initiate a, data transfer cycle;

FIG. 3 is a block diagram illustrating the logic circuit formed to implement the method of the present invention;

FIG. 4 is a logic diagram illustrating an alternate embodiment of the invention, incorporating a maximum burst length for each data transfer cycle; and FIG. 5 illustrates an alternate embodiment of the invention.

DETAILED DESCRIPTION OF THE INVENTION

Turning now to the Figures and in particular FIG. 1, there is shown a data processing system, designated generally with the reference numeral 10, comprising a processor unit 12, coupled to a number of device controller units 14 16 and 1B by an input/output (I/0) bus 20. The device controller units are, generally, of conventional design in that they are operable to control one or more peripheral devices of a particular type, although the present invention need not be so limited. For example, the device controller unit 14 operates to control data transfers between the processor unit 12 and one or more disk drive units 22. Similarly, the device controller unit 16 operates to control data transfers between the processor unit 12 and one or more tape devices 24, while the device controller unit 18 controls data transfers with a communications device 26.

The I/O bus 20 is of the type formed from a of signal lines for communicating instructions (commands). handshake signaling, and multi-bit data words between the processor unit 12 and the device controllers 14–18. Often, although not always, the processor unit will incorporate a channel 28 that operates to connect the I/O bus to the processor unit 12 to handle some of the more mundane tasks of a data transfer cycle. Data is transferred in 16-bit data words on 16 DATA lines 30 (FIG. 2A) of the I/O bus 20, while the commands are transmitted on a subsidiary bus that is a part of the I/O bus 20 called a "T-bus", formed by four signal lines 32 (FIG. 2A).

Typically, data transfers are initiated when the processor unit 12 determines that data is to be sent to, or obtained from, one of the peripheral devices 22–26. The processor unit issues a command on the T-bus signal lines 32, identifying the peripheral device by an address that issues on the DATA lines 30. The T-bus command also indicates the direction of transfer (i.e.. from the processor unit 12 to the peripheral device, or the other way). The processor unit 12 must usually wait a large amount of processor time until the specific peripheral device is ready to engage in a data transfer cycle. Accordingly, the device controller is constructed to allow the processor unit 12 to perform other tasks while the device controller sets up for the data transfer. When the device controller has completed its set-up tasks, it will notify the processor unit 12 by issuing a reconnect ($\overline{RCI}$ —an active LOW signal) signal on a signal line 34 (FIG. 2A) of the I/O bus 20. requesting access to the I/O bus 20 and a data transfer cycle. The request is noted by the processor unit 12. and ultimately acted upon when the processor unit 12 finds an appropriate time to respond.

Referring now to FIG. 2A, the internal architecture of the device controller unit 14 is illustrated in block diagram form. The other device controller units 16 and 18 are essentially identical so that the following discussion will apply to them equally. FIG. 2A shows the device controller unit 14 as including a microprocessor 40 that connects to address logic 42 via an address bus 44, and to port logic 46 via a mode select (MODE SEL) bus 48. The address logic 42 connects to a buffer memory 50 which, in turn, is coupled to the I/O bus 20 by the port logic 46 and an internal data bus 52.

The address logic 42 is of conventional design. and is configured to be preset with the beginning and ending buffer 50 addresses of the data to be transferred. The address logic 42 includes control logic (not shown). such as a state machine (not shown), that permits the address logic 42 to operate autonomously with the information provided by the microprocessor 40—and under a "start/stop" control of the port logic 46. As FIG. 2A illustrates, a stop transfer (STOP XFR) signal is received by the address logic 42 from the port logic 46. When active, the STOP XFR signal operates to halt operation of the address logic 42. When the address logic has completed its tasks—generally. this is when the data has been transferred—a DMAEND signal is issued. As will be seen, the DMAEND signal will cause activation of the STOP XFR signal.

Control of the peripheral devices that are attached to the device controller 14 are effected by the device control logic 54. The device control logic, in response to instructions communicated thereto by the microprocessor 40 via an instruction bus 55, controls the peripherals connected thereto, and operates to control the data transfers between the attached device and the buffer 50.

As indicated above. the T-bus signal lines 32 carry the commands issued by the processor unit 12. Although the exact protocol for data transfers between the channel 28 of the processor 12 and any of the peripheral devices is not necessary to the understanding of the invention, there are certain signals that are important to the invention: One is the reconnect ($\overline{RCI}$) signal which a device controller generates to request access to the I/O bus 20 for data transfers.

Similar to the $\overline{RCI}$ signal is an interrupt request ($\overline{IRQ}$) signal that is generated by any one of the device controllers 14, . . . , 18 to indicate that a data transfer cycle (or other I/O operation) is complete. For purposes of this discussion, however, the $\overline{IRQ}$ signal operates in essentially the same manner to produce the same result as the $\overline{RCI}$ signal. Thus only the E,ovs/RCI/ signal need be described.

As explained above, all data transfers are initiated by a command issued from the channel 28 of the processor unit 12 to a designated device controller and attached peripheral device. When the device controller has set up to execute the data transfer command, it will request access to the I/O bus 20 by issuing an E,ovs/RCI/ signal on the signal line 34 of the I/O bus 20. The processor unit 12 determines which of the device controller units 14, ..., 18 issued the $\overline{\text{RCI}}$ signal (if more than one, the processor unit will select one on a predetermined priority basis), and commences the data transfer cycle.

Data transfers themselves are accompanied by a "handshaking" between the processor unit and the device controller unit, using the service-out (SVO) and service-in (SVI) signals carried on the signal lines 36, 38, respectively. The SVO and SVI handshake signals respectively indicate, for data transfers, when data is stable on the data lines of the I/O bus 20 and when that data has been accepted by the unit receiving the data.

This handshaking sequence is shown in FIG. 2B, illustrating the handshaking that occurs during a data transfer cycle: Data is placed by the processor unit 12, for example, on the 16 DATA lines 30 of the I/O bus 20 and, when stable, the SVO signal (carried by the signal line 36 of the I/O bus 20) is brought HIGH. The device controller unit 14 accepts the data, and when accepted responds with the SVI signal. The data processor drops the SVO line which in turn causes the device controller to drop the SVI line—until the next handshake. A more complete description of the particular protocol used can be found in U.S. Pat. No. 4,228,496.

As explained previously, prior techniques of data transfers were limited to short bursts of a predetermined number of data words (word serial, bit parallel) to provide time for other of the device controllers that may be on the same I/O bus to transfer data. Thus, if more than the predetermined number of words of data were to be transferred, a number of bursts were necessary, thereby deteriorating the effective data rate of such transfers. According to a preferred form of the present invention, however, the data transfer will continue until one of two events occurs: (1) The controller detects a request for a data transfer cycle is issued by another of the device controllers on the bus, or (2) all the data to be transferred is transferred. As will be seen, an alternate embodiment of the invention introduces a third event that can terminate a data transfer cycle: (3) the controller transfers a predetermined maximum number (less than the entire number) of data words.

Referring now to FIG. 3, certain of the elements used in the implementation of the present invention are illustrated. As FIG. 3 shows, the decode logic 46 includes a decoder circuit 60 for receiving and decoding the command signals communicated on the T-bus signal lines 32 and the DATA lines. One of the commands, a device selection command, decodes to generate a selection (active LOW) signal ($\overline{\text{SEL}}$) that is communicated to a clear (CLR) input of an RCI latch 62. A HIGH-to-LOW transition of the $\overline{\text{SEL}}$ signal operates to clear the RCI latch 62, forcing the Q output of the latch LOW. The set (SET) input of the RCI latch 62 receives the MODE SEL signal from the microprocessor 40 (FIG. 2A) via a NOR gate 61a. When HIGH the MODE SELECT signal will set the RCI latch 62 (by forcing the Q output HIGH).

The SET input of the RCI latch also receives, via the NOR gate 61a the product of the AND gate 61b. When the coincidence condition imposed by the AND gate 61b upon the two received signals, STOP XFR and $\overline{\text{DMAEND}}$, is met, the RCI latch will be set.

The Q output of the RCI latch 62 is communicated to one input of an open-collector NAND gate 63, whose output is tied to external (to the port logic 46) pull-up resistor R. and to the signal line 34 of the I/O bus 20 carrying the $\overline{\text{RCI}}$ signal. The pull-up resistor R connects to open-collector devices of the other device controllers, permitting what is typically known as "wire-ORing."

The second input of the NAND gate 63 receives the carry-out ($C_o$) output of a timer 69. The output of the NAND gate 63 is also coupled to one to of two negative inputs of a negative-input OR gate 65. The other input receives the $\overline{\text{IRQ}}$ from the I/O bus 20.

The output of the OR gate 65 connects to the enable (EN) of a four-bit counter 64. The clock (CK) input of the counter 64 receives the SVI signal from a delay circuit 66. (The SVI signal is, as FIG. 3 indicates, merely a delayed version of the SVO signal from signal line 36 of the I/O bus 20—see FIG. 2B). The carry-out ($C_o$) output of the counter 64 is connected to one input of a dual-input OR gate 67, the other input receiving a DMAEND signal from the address logic 42. The OR gate 67 produces the STOP XFR signal that is applied to the address logic to terminate continued access (i.e., reading or writing) of the buffer 50. Thus, occurrence of the STOP XFR signal depends upon (1) the $C_o$ signal from the counter 64, or (2) signaling (via the DMAEND signal) that the address logic 42 has reached the end of the data to be transferred.

The $\overline{\text{SEL}}$ signal developed by the decode circuit 60 is also applied to the SET input of a SELECT latch 68. When the $\overline{\text{SEL}}$ signal drops, the SELECT latch 68 is set, and the Q output of the SELECT latch 68 will go HIGH. The Q output of the SELECT latch 68 connects to an enable (EN) input of the delay circuit 66, and operates to enable the delay circuit 66 to receive the incoming SVO signal and to develop therefrom the SVI clock When the Q output of the SELECT latch is LOW. the delay circuit 66 is disabled so that an SVI signal is developed from the SVO signal only by that device controller that has been selected by the processor unit 10.

Finally, the port logic 46 includes a timer circuit 69 that is triggered by occurrence of the STOP XFR signal produced by the OR gate 67. As will be seen, the timer circuit 69 determines the amount of hold-off time the device controller must observe, after terminating a data transfer, before it can request access to the I/O bus 20.

In operation, the method of the present invention proceeds generally as follows: A data transfer cycle is initiated along the lines described above: A command (indicating the operation desired) issues on the T-bus 32, along with an identification of the desired peripheral on the DATA lines 30 of the I/O bus 20. The command is decoded by the device controllers 14. ..., 18, and the designated device controller then begins to ready itself for the requested data transfer cycle. When the select device controller is ready, the microprocessor 40 will issue a MODE SEL signal to set (via the NOR gate 61a) the RCI latch 62 and bring the Q output of the latch HIGH. Via the NAND gate 63 (the $C_o$ output of the timer 69 is HIGH when not timing out), the now-ready device controller 14. ..., 18 requests access to the I/O bus by producing the $\overline{\text{RCI}}$ signal.

Responding to the $\overline{\text{RCI}}$ signal, the processor unit 12 issues a device controller selection by information communicated on the T-bus 32 and DATA lines 30. When decoded by the decode logic 60, the RCI latch 62 is cleared (terminating the $\overline{\text{RCI}}$ request signal of the selected device controller, and the SELECT latch is set to enable the delay circuit 66.

Assume, for the purposes of this discussion, that data is to be transferred from the processor 12 to a peripheral device attached to the designated device controller (e.g., device controller 14). As each data word to be transferred is placed on the DATA lines of the I/O bus 20, the processor 12 will bring the SVO line HIGH, indicating that data is present and stable on the DATA signal lines 30. The device controller will load the data then appearing on the DATA lines 30 into the buffer 50 at a location designated by the address logic 42 with the SVI signal, a delayed version of the SVO signal. Note that although all device controllers 14, . . . , 18 receive the SVO signal, only the selected device controller derives the SVI signal to clock its corresponding counter 64—the selected device controller. The selection operation, setting the SELECT latch 68 as it does, enables the delay circuit to pass the received SVO signal as the SVI signal.

The SVI signal developed by the selected device controller is returned to the processor unit 12 via signal line 38 of the I/O bus 20, informing the processor that the data was accepted and the device controller is ready for the next data word.

The data transfer cycle will continue until one of two events transpire: Either (1) the entire block of data words is transferred, uninterrupted, or (2) another of the device controllers (e.g.. 16 or 18) requests access to the I/O bus 20 through the medium of an $\overline{RCI}$ signal. (Latches, similar if not identical to RCI latch 62, in the other device controllers, generate the $\overline{RCI}$ signal). In the former case, the DMAEND signal is communicated from the address logic 42 (FIG. 2A) to signal the end of a data transfer cycle; in the latter case the request for access to the I/O bus is sensed by the active-low input OR gate 65. This enables the four-bit counter 64. The data transfer cycle continues. despite the request for access to the I/O bus 10 by another of the device controllers, until the counter 64 reaches a count that causes the $C_o$ output to go HIGH, signifying termination of the data transfer cycle a predetermined number (here. 16) of transferred data words after noting the occurrence of the $\overline{RCI}$ signal. The STOP XFR signal disables the address logic 42.

As FIG. 3 illustrates the $C_o$ output from the four-bit counter 64, via the OR gate 67, enables the timer 69. During period of counting by the timer 69—which determines the "hold-off" period explained above—the $C_o$ output of the timer 69 is LOW. The NAND gate 63 is thereby disabled. However, the STOP XFR signal occurred, not as the result of an end of transmission (in which case the DMAEND signal would be HIGH). but as the result of another device controller requesting a data transfer cycle. Thus, the two signals. STOP XFR and $\overline{DMAEND}$, will operate to again set the RCI latch 62. A request for access to the I/O bus is not made, however, until the timer 69 times out, at which time the $C_o$ output of the timer goes HIGH. The NAND gate 63 is enabled, and the request, through the $\overline{RCI}$ signal, is made. The device controller now awaits selection by the processor unit 12 for a data transfer cycle. This process continues until the device controller has been able to transfer all of the data words to be transferred.

In the event the data words are transferred before the four-bit counter 64 times out, the DMAEND signal will go HIGH to generate the terminating STOP XFR signal.

There are times when the processor 10 will need the attention of a device controller, or conversely. a device controller may want the attention of the processor for reasons other than data transfer. In this case the $\overline{IRQ}$ signal is used as the request. Appearance of the $\overline{IRQ}$ puts into effect the same operation described above as does the $\overline{RCI}$ signal, insofar as interruption of any data communication cycle is concerned.

FIG. 4 illustrates an alternate embodiment of the invention in which the number of data words transferred in absence of any other request for the I/O bus 20 is limited to a selectable maximum. As FIG. 4 shows, the basic concept of the preferred embodiment of the invention shown in FIG. 3 is kept (i.e., in the form of the four-bit counter 64). In this alternate embodiment, an eight-bit counter 80 is added, and used, as will be seen, to form the upper limit on the number of data words that a device controller can transfer during any one data transfer cycle (absent another request for access to the I/O bus). Here, that upper limit is 256 data words. Thus, as will be seen, even though the data transfer cycle may continue uninterrupted. the maximum number of data words transmitted will be limited by the eight-bit counter 70.

In the embodiment of FIG. 4, the four-bit counter 64 could have been enabled, as before, by the output of the gate 65 (resulting, in turn, by the setting the RCI latch 62—FIG. 3). However, to show that there are other alternatives, particularly in the combination of this alternate embodiment, the four-bit counter 64, and the eight-bit counter 70, are both connected to receive the Q output of the SELECT latch 68 at their respective enable (EN) input. Thus, both counters 64 and 70 are enabled by setting the SELECT latch 68. The clock (CK) input of the four-bit and eight-bit counters 64 70 receive the SVI signal (generated, as shown in FIG. 3, by the delay circuit 66 that, also as shown in FIG. 3, is enabled by the Q output of the SELECT latch 68).

The carry-out ($C_o$) outputs of the four and eight bit counters 64, 70 are received at a corresponding input of two of three AND gates 74, 76, and 78, respectively: the output of an OR gate 72 is connects to an input of the third two-input AND gate 76. The outputs of all three of the AND gates 74, 76, and 78 are connected to an input of a three-input OR gate 80, which produces the STOP XFR signaling discussed with respect to FIG. 3 (producing the same operation).

A three-bit mode register 82, which is accessible to the microprocessor 40 (FIG. 2A) via signal lines 84, operates to hold certain "flags" that function to selectively determine how the conditions under which a data transfer cycle will be conducted. The content of the mode register 82 functions to selectively enable or disable the AND gates 74, 76, and 78, selecting a mode of operation. For example, a ONE in the bit position 82c, and ZEROs in the other bit positions, will enable the AND gate 78, permitting the $C_o$ output of the 8-bit counter to generate the STOP XFR signal. In this mode, every data transfer cycle will terminate when 256 data words have been transferred, or all data words that are to be transferred, whichever is less. Conversely, the operation of the eight-bit counter 70 can effectively be disabled by writing a ZERO to the bit position 82c of the mode register to inhibit the eight-bit counter s influence at AND gate 78.

Other modes of operation could include the following, depending upon the content of the mode register 82: Reading a ONE into the bit position 82b, and ZEROs into the bit positions 82a and 82c enables the AND gate 76 and disables the AND gates 74 and 78. This places the controller in a configuration that, when another request for the I/O bus is detected (by occurrence of one or the other or both of the $\overline{IRQ}$ or the $\overline{RCI}$ signals), terminates the present data transfer cycle after the number of data words indicated by the content of the 4-bit counter 64 have been transferred (or the number of data words needed to complete the data transfer, again whichever is less). Conversely, writing a ONE to the bit position 82a and ZEROs to the bit positions 82b and 82c will place the controller in a configuration that emulates present day controllers: Every data transfer cycle will be limited to 16 data words, and must wait a set period to continue.

Of course it will be evident to those skilled in this art that combinations of the above-discussed controller configurations can be attained by writing the mode register 82. Thus, ONEs in the bit positions 82b and 82c (and a ZERO in the bit position 82a) of the mode register 82 configures the controller so that it is amenable to interruption of a data transfer cycle, but limit any one data transfer cycle to 256 words absent any interruption.

Operation of this alternate embodiment is essentially the same as that discussed with respect to FIG. 3., except for the ability to configure the data transfer cycles as discussed (with reference to FIG. 4): The primary difference being dependent upon that configuration. Thus, a data transfer cycle may be requested by the processor unit 12 (FIG. 1). and when the controller 14. . . . , 18 is ready, it will request access to the I/O bus 20 by setting the RCI latch 62 associated with that controller to make the $\overline{\text{RCI}}$ signal active. When the controller 14. . . . , 18 is selected by the selection information (received on the DATA and T-bus signal lines of the I/O bus 20). the associated RCI latch 62 is cleared, and the SELECT latch 68 is set by the $\overline{\text{SEL}}$ signal. The 4-bit and 8-bit counters 62 and 68 are now enabled for counting upon receipt of the SVI clock signal, and the delay circuit 66 is enabled so that the SVI signal can be generated.

As explained above, each transferred data word is accompanied by a pulse of the SVI signal. Thus, the four-bit and eight-bit counters operate in response to the SVI signal to count the number of data words being transferred during a data transfer cycle. Depending upon what the microprocessor 40 writes to the mode register 82, the FIG. 4 embodiment will operate according to the configurations explained above.

A more preferred implementation of that embodiment of the invention illustrated in FIG. 3, and described above, is now illustrated in FIG. 5. Remembering the FIG. 3 discussion, that embodiment required a device controller whose data transfer cycle had been interrupted to wait a predetermined "hold-off" time (determined by the timer 69) before requesting further access to the I/O bus 20 through initiation of the $\overline{\text{RCI}}$ signal. It may be, however, that the interrupting access request was very short, in which case there may be no need to wait the entire hold-off period. This is the thrust of the embodiment of FIG. 5.

Turning now to FIG. 5, in which the common elements of FIGS. 5 and 3 are given the same designations. it can be seen that the primary difference between the FIG. 3 and FIG. 5 embodiments is an additional sensing circuit gO in FIG. 5, comprising a two-input AND gate 92 and a two-input OR gate 94. The AND gate 92 receives the $\overline{\text{IRQ}}$ and $\overline{\text{RCI}}$ signals. The OR gate 94 receives the output of the AND gate 92 and the $C_o$ output of the timer 69. The signal (HIGH) produced by the OR gate 94 operates to enable the NAND gate 63 to make the $\overline{\text{RCI}}$ signal active if the RCI latch 60 has been set.

The operation of the embodiment of the port logic 46 shown in FIG. 5 is substantially identical to that described above with respect to FIG. 3 with the following exception: When, during a data transfer cycle, another device controller requests access to the I/O bus 20 by initiating an $\overline{\text{RCI}}$ signal, and the interrupted device controller temporarily terminates a data transfer with the STOP XFR signal, leaving additional data to be transferred, it may again request access to the I/O bus when the timer 69 times out, as described above. However, in addition, if the device controller that interrupted the data transfer is the only one requesting service, when it is selected by the processor unit 12, the $\overline{\text{RCI}}$ line will go HIGH when that device controller is selected. At the same time, the $\overline{\text{IRQ}}$ signal is also HIGH and, therefore, a HIGH appears at the output of the AND 92, which is passed by the OR gate 94 to enable the NOR gate 63, thereby initiating a request for access to the I/O bus 20 through the medium of the $\overline{\text{RCI}}$ signal.

Thus, rather than having to wait the time period set by the timer 69 before initiating another request for access to the I/O bus 20, a device controller incorporating the embodiment of port logic 49 illustrated in FIG. 5 can immediately initiate a request when an interrupting device controller has been selected and there are no other outstanding requests for access. It should be evident to those skilled in this art that this method of overlapping greatly speeds up data transfers between peripheral devices controlled by device controllers structured along the lines of the inventions disclosed herein and processor units.

I claim:

1. In a data processing system of the type having a central processor unit and a plurality of device controller units intercoupled by an input/output bus, each of the plurality of device controller units being operable to request access to the input/output bus for a data transfer cycle with the processor unit by generating a request signal and, during the data transfer cycle, to control the transfer of a number of data words between the central processor unit and a peripheral device connected to the device controller unit, at least one of the device controller units having apparatus for terminating prematurely the data transfer cycle in response to the occurrence of the request signal from another of the plurality of device controller units to permit the another of the plurality of device controller units access to the input/output bus, the apparatus comprising:
    first circuit means for generating a detection signal in response to occurrence of the request signal during the data transfer cycle; and
    second circuit means coupled to receive the detection signal and operable to terminate the data transfer cycle when a first predetermined number of data words have been transferred after generation of the detection signal or completion of the data transfer cycle, whichever occurs first.

2. The apparatus of claim 1, the first circuit means including means responsive to occurrence of an interrupt signal generated by the central processor unit to produce the detection signal.

3. The apparatus of claim 1, the second circuit means including counter means for counting the first predetermined number of transferred data words.

4. The apparatus of claim 1, the second circuit means including means for terminating the data transfer cycle, in absence of the detection signal, after the transfer of a second predetermined number of data words during the data transfer cycle by the one device controller unit, the second number of predetermined number being larger than the first predetermined number.

5. The apparatus of claim 1, including request means operable to initiate the request signal.

6. The apparatus of claim 5, the request means including means responsive to the termination signal for inhibiting initiation of the request signal by the one device controller for a predetermined time period.

7. In a data processing system having a central processor unit coupled to a plurality of device controllers by an input/output bus, each of the device controllers being of the type operable to control data transfers between at least one peripheral device and the processor unit subsequent to generating a request signal preparatory to initiating a data transfer cycle, each data transfer cycle consisting of the transfer of a block of data words, apparatus in at least one of the device controllers for adjusting the data word bursts according to the needs of the other device controllers, the apparatus comprising:
  detector means for providing an indication of the presence of the request signal generated by one or more of the other of the plurality of device controllers;
  counter means coupled to receive the indication for counting a remaining number of data words transferred after occurrence of the indication; and
  circuit means coupled to the counter means for terminating the data transfer after the remaining number of data words has been transferred.

8. In a data processor system of the type including a processor unit coupled to a plurality of device controllers, each of the device controllers being operable to control multiple word data transfers between a peripheral unit coupled thereto and the processor unit during a data transfer cycle, the device controller being further operable to request the data transfer cycle by generation of a request signal, a method of terminating the occurrence of the data transfer cycle between a one of the device controllers and the processor unit when another of the device controllers requests the data transfer cycle by issuance of the request signal, the method comprising the steps of:
  signaling the occurrence of the request signal;
  responding to the signaling by issuing a termination signal a first predetermined number of transferred data words after occurrence of the signaling or upon completion of the data transfer cycle, whichever occurs first; and
  terminating the data transfer cycle when the termination signal is present.

9. The method of claim 8, including the step of waiting a predetermined period of time after occurrence of the termination signal before allowing the one of the device controllers to request a data transfer cycle by generation of the request signal.

10. The method of claim 8, wherein the issuing step further includes issuing the termination signal in absence of the signalling when a second predetermined number of data words has been transferred.

* * * * *